(12) United States Patent
Chandrasekar et al.

(10) Patent No.: US 8,171,007 B2
(45) Date of Patent: May 1, 2012

(54) CREATING BUSINESS VALUE BY EMBEDDING DOMAIN TUNED SEARCH ON WEB-SITES

(75) Inventors: Raman Chandrasekar, Seattle, WA (US); Dean A. Slawson, Beijing (CN)

(73) Assignee: Microsoft Corporation, Redmond, WA (US)

( * ) Notice: Subject to any disclaimer, the term of this patent is extended or adjusted under 35 U.S.C. 154(b) by 436 days.

(21) Appl. No.: 12/105,866

(22) Filed: Apr. 18, 2008

(65) Prior Publication Data

US 2009/0265331 A1  Oct. 22, 2009

(51) Int. Cl.
*G06F 7/00* (2006.01)
*G06F 17/00* (2006.01)

(52) U.S. Cl. .................................................. 707/706
(58) Field of Classification Search .................. None
See application file for complete search history.

(56) References Cited

U.S. PATENT DOCUMENTS

| | | | |
|---|---|---|---|
| 6,523,026 | B1 | 2/2003 | Gillis et al. |
| 7,181,438 | B1 * | 2/2007 | Szabo .................. 1/1 |
| 7,287,012 | B2 | 10/2007 | Corston |
| 2004/0054673 | A1 | 3/2004 | deMent |
| 2005/0165753 | A1 | 7/2005 | Chen |
| 2005/0278321 | A1 | 12/2005 | Vailaya et al. |
| 2006/0004732 | A1 | 1/2006 | Odom |
| 2006/0047649 | A1 * | 3/2006 | Liang .............. 707/4 |
| 2006/0074910 | A1 | 4/2006 | Yun |
| 2007/0106974 | A1 | 5/2007 | Chafe |
| 2007/0150470 | A1 * | 6/2007 | Brave et al. .............. 707/6 |
| 2007/0283425 | A1 * | 12/2007 | Ture et al. ............... 726/5 |
| 2007/0288439 | A1 | 12/2007 | Rappaport |
| 2008/0027812 | A1 | 1/2008 | Hsu |
| 2009/0157642 | A1 * | 6/2009 | Diab et al. ............... 707/3 |
| 2010/0185611 | A1 * | 7/2010 | Liao et al. ............. 707/728 |

OTHER PUBLICATIONS

Unknown, Introduction: Business Methods Toolkit, Apr. 2005, Dialog: A Thomson Company, Contact Information + pp. 1-12.*
Soumen Chakrabarti et al., "Focused crawling: a new approach to topic-specific Web resource discovery" 1999 Published by Elsevier Science B.V. 18 pages.

(Continued)

*Primary Examiner* — Kuen Lu
*Assistant Examiner* — Jason Liao
(74) *Attorney, Agent, or Firm* — Westman, Champlin & Kelly, P.A.

(57) ABSTRACT

Domain specific topics, and optionally uniform resource locators (URLs) can be received from a user, and from those domain specific topics and URLs, domain tuned search definitions are generated for a given domain. The domain tuned search definitions are saved and the user is provided with a definition of a domain tuned search interface that is embedded on a site specified by the user. When someone reviewing the user's web site performs a search using the domain tuned, embedded search interface, a search engine is invoked which performs a search on the user's input query, and then returns domain specific search results. The search engine searches for domain specific search results over web sites in addition to the web site that the user is currently reviewing, so the search is more precise than a general web search but broader than a specific site search.

20 Claims, 12 Drawing Sheets

OTHER PUBLICATIONS

Eric J. Glover et al. "Improving Category Specific Web Search by Learning Query Modifications" eBusiness Research Center 2001. 10 pages.

Konstantinos Stamatakis et al. "Domain-SpecificWeb Site Identification: The CROSSMARC Focused Web Crawler" 2003 pp. 75-78.

Krishna Bharat et al. "Improved Algorithms for Topic Distillation in a Hyperlinked Environment" To appear at the 21st ACM SIGIR Conference on Research and Development in Information Retrieval 1998. 9 pages.

Raman Chandrasekar et al. "Subwebs for Specialized Search" SIGIR'04, Jul. 25-29, 2004, Sheffield, South Yorkshire, UK. ACM 1-58113-881-4/04/0007pp. 480-481.

PCT/US2009/041053 Search Report and Written Opinion mailed Nov. 30, 2009.

"European Search Report", Mailed Date: Apr. 1, 2011, Application No. EP/09731785, Filed Date: Mar. 31, 2011, pp. 3.

* cited by examiner

CREATING BUSINESS VALUE BY EMBEDDING DOMAIN TUNED SEARCH ON WEB-SITES

BACKGROUND

Currently, using computers to perform online searching is very popular. This has been, for many years, a pervasive mechanism by which people obtain information, and a great deal of technology, innovation and financial resources, have been expended in this area. To a large extent, searching has become an integral part of people's online behavior.

However, the user experience when attempting to perform online searching is still, in many ways, unsatisfactory. The way people typically search for information online today is that they first open an interface to a search engine and then submit an initial query to that search engine. The search engine searches web content and returns a list of search results, which are usually linked to web pages that the search engine has calculated to be relevant to the user's query. The user then normally engages in a tedious recursive process by which the user repeatedly navigates from a link on the search results page returned by the search engine to the site identified by the link, browses that site (or web page) and returns to the search engine in order to click on another link to navigate to another web page.

Typically, a user may be performing a task, such as writing a document, performing research, etc. and, in the middle of that task need to perform the searching operation in order to obtain additional information. Therefore, the tedious recursive navigation required by the user in a conventional search system takes the user away from the task at hand.

Some types of automatically focused searching techniques have also been used. For instance, when the user is reviewing a web page, the web page may have an embedded search box that allows the user to enter one or more search terms to perform additional searching. However, the search box on such a web page normally allows the user two options. The first option is that the user can perform a web search, which is a general search of web content. The second option is that the user can search content on the site that contains the page which the user is currently reviewing. These options are both extremes. The web search is simply a gateway to a general purpose search that searches web content, while the site search only allows a user to search the content of a single, individual, web site.

The discussion above is merely provided for general background information and is not intended to be used as an aid in determining the scope of the claimed subject matter.

SUMMARY

Domain specific topics, and optionally uniform resource locators (URLs) can be received from a user, and from those domain specific topics and URLs, domain tuned search definitions are generated for a given domain. The domain tuned search definitions are saved and the user is provided with a definition of a domain tuned search interface that is embedded on a site specified by the user, or made available on a central server. When someone reviewing the user's web site performs a search using the domain tuned, embedded search interface, a search engine is invoked which performs a search on the user's input query, and then returns domain specific search results. The domain specific search results include search results not restricted to the web site that the user is currently reviewing.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
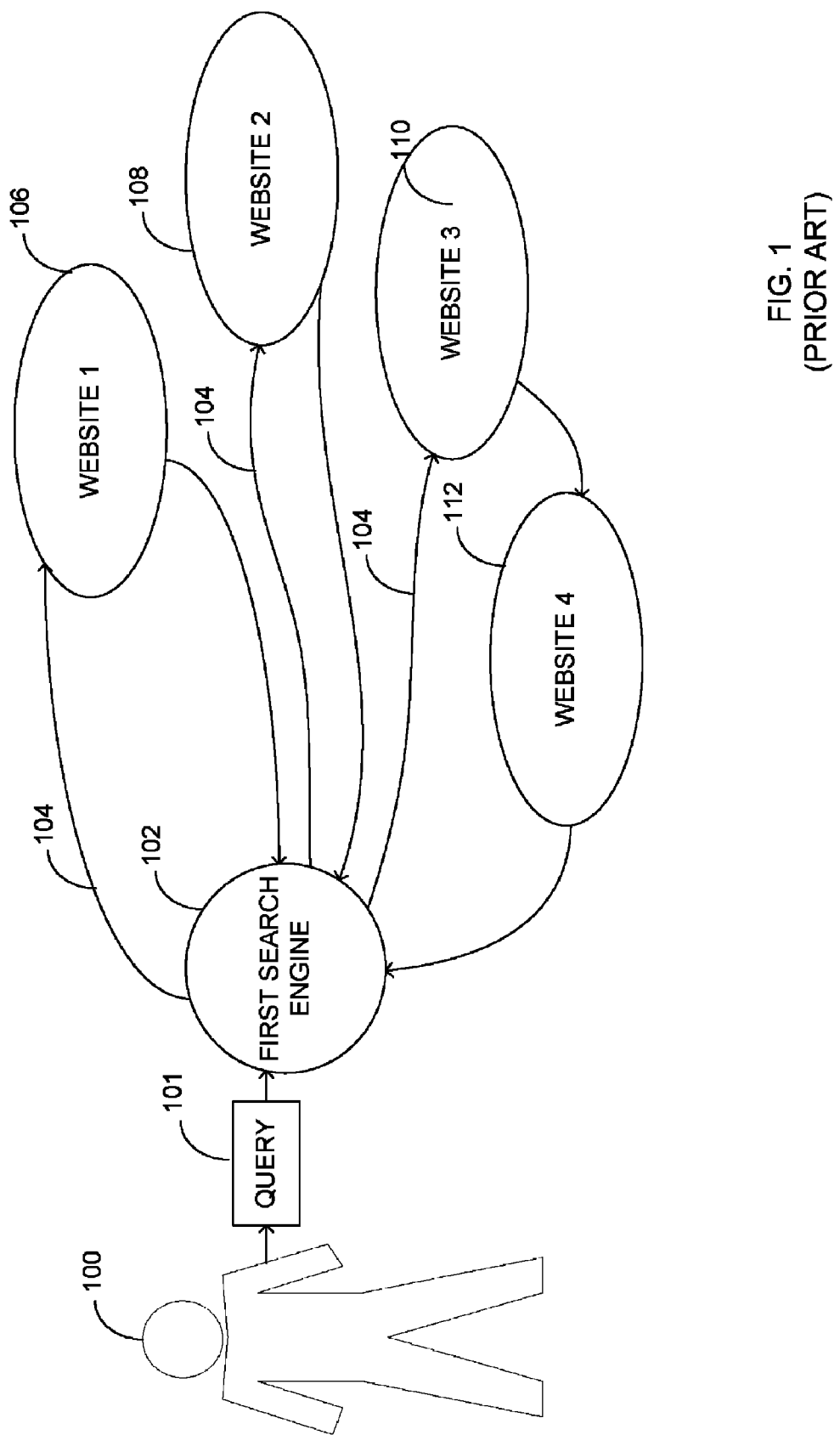
FIG. 1 is block diagram illustrating a conventional search behavior.

FIG. 1 is a block diagram illustrating conventional search behavior in accordance with the prior art. In FIG. 1, a user 100 invokes a search engine 102 by submitting a query 101. The search engine utilizes the query to return a page of results that have navigable links 104 (such as hyperlinks) to a plurality of different web pages. The user then illustratively clicks on one of links 104 and navigates to one of the web pages 106, 108, or 110, to which the individual links 104 lead. The user can then review the web page that has been navigated to.

If that web page does not contain adequate information, the user must often then return to the search engine 102 and click another link 104 to go to another web page listed on the page of search results. The user may also click a link that is on one of the result pages (such as page 110) that navigates the user to yet another web page 112. Again, if that web page 112 still does not contain adequate information, the user must again return to search engine 102, and this type of repetitive process continues until the user has either clicked through enough of the results, or submitted a sufficient number of queries, to obtain the desired information.

Figure 2:
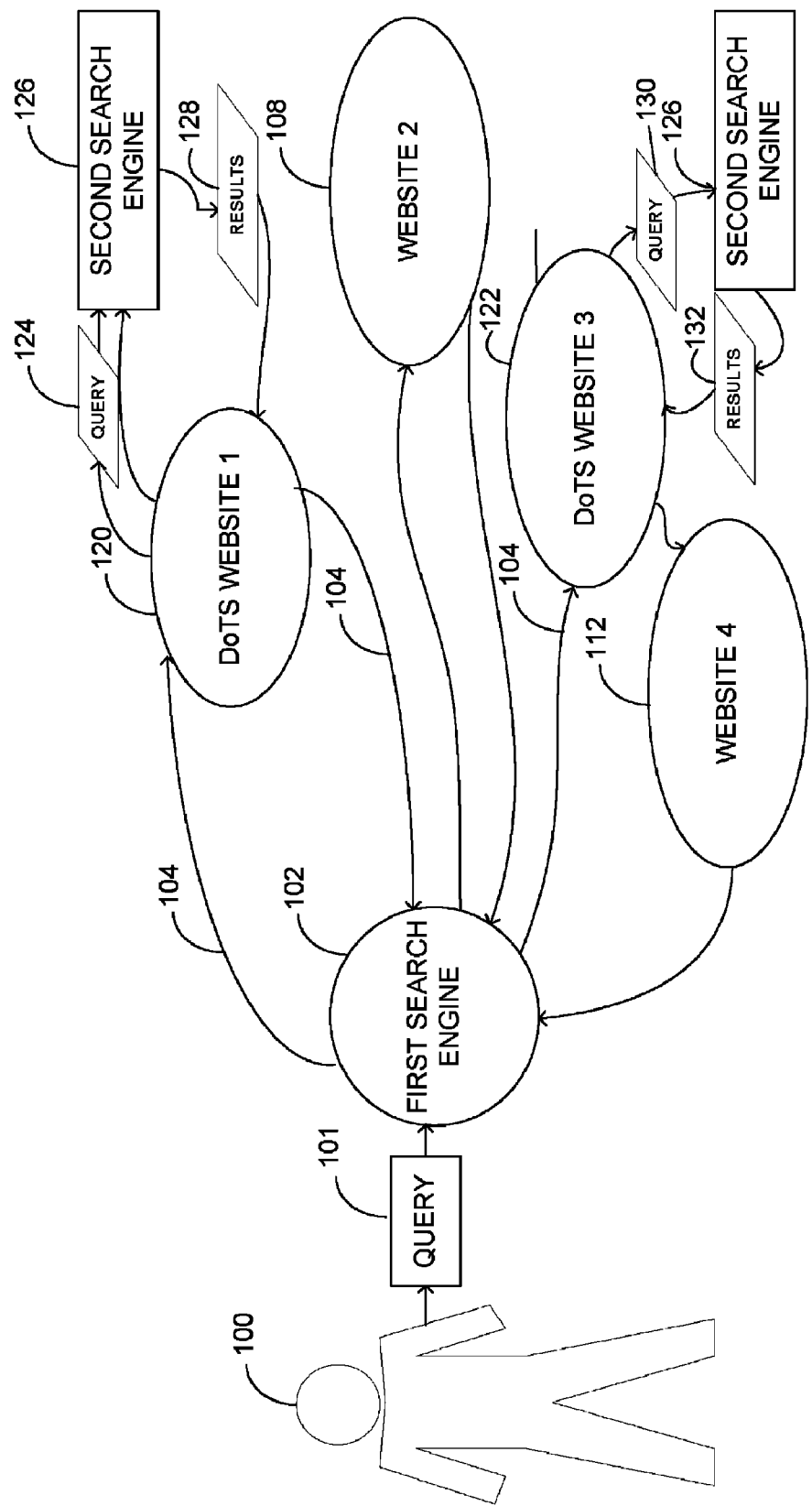
FIG. 2 is a block diagram illustrating domain tuned search behavior.

FIG. 2 is a block diagram which illustrates one embodiment of searching behavior using the system discussed herein. In FIG. 2, user 100 again submits a query 101 to the first search engine 102, and the search engine 102 returns a set of links 104 to a set of web pages, based on the user's query.

This is similar to FIG. 1. However, in the embodiment shown in FIG. 2, web sites 120 and 122 are enabled with domain tuned search capabilities.

In one embodiment, web sites 120 and 122 include web pages with embedded domain tuned search interfaces on them. Therefore, when the user clicks on link 104 to navigate to page 120, the page will be displayed with a domain tuned search box that the user can use to enter an additional query. In the embodiment shown in FIG. 2, the sponsor of web site 120 has already defined a domain-specific subweb. Some techniques for doing this are described below with respect to FIGS. 3, 4 and 10. Suffice it to say, for now, that the domain-specific subweb allows a subweb engine to receive generic search results performed based on the query, and preferentially rank search results that have content closer to a domain definition input by the user, than other search results.

Therefore, the user viewing the page of web site 120 with the embedded domain tuned search interface will submit an additional query 124 through the domain tuned search interface. By submitting that query, a second search engine 126 (it is referred to as a second search engine to distinguish is from first search engine 102, although the two could be the same as well) is invoked and performs domain tuned searching based on the query 124. The domain tuned searching will include searching of other web sites, other than web site 120, but it will return search results that are more closely related to the domain defined by the sponsor of web site 120, than other search results. Therefore, the domain tuned search results 128 returned by second search engine 126 will be less restricted than results that would otherwise be returned using prior site search technology, but will be much more relevant than other results returned using generic web search technology.

The system enables the sponsor of web site 120 to define the subwebs that the domain tuned search will be performed over. Therefore, the sponsor can direct viewers of web site 120 to any desired subject matter, such as to other web sites sponsored by the same sponsor, such as to other related information offered by other parties, or to any other information that the sponsor defines as being domain specific (i.e., within the subweb definition).

It can be seen in FIG. 2 that web site 122 is also enabled with domain tuned search capability. In other words, the web page displayed on site 122 will include an embedded domain tuned search interface that allows the user to perform a domain tuned search from that web page. That search will be performed over more sites than just site 122, but it will be tuned to the domain defined by the sponsor of web site 122. When the user inputs the query 130 to the domain tuned search interface, second search engine 126 performs the domain tuned searching and returns domain tuned search results 132 to the user through the interface displaying the page of web site 122. It should also be noted, of course, that while FIG. 2 shows that the domain tuned search results 128 and 132 are returned through the same interface displayed at web sites 120 and 122, respectively, they could be returned to the user 100 as a separate search results page as well.

Figure 3:
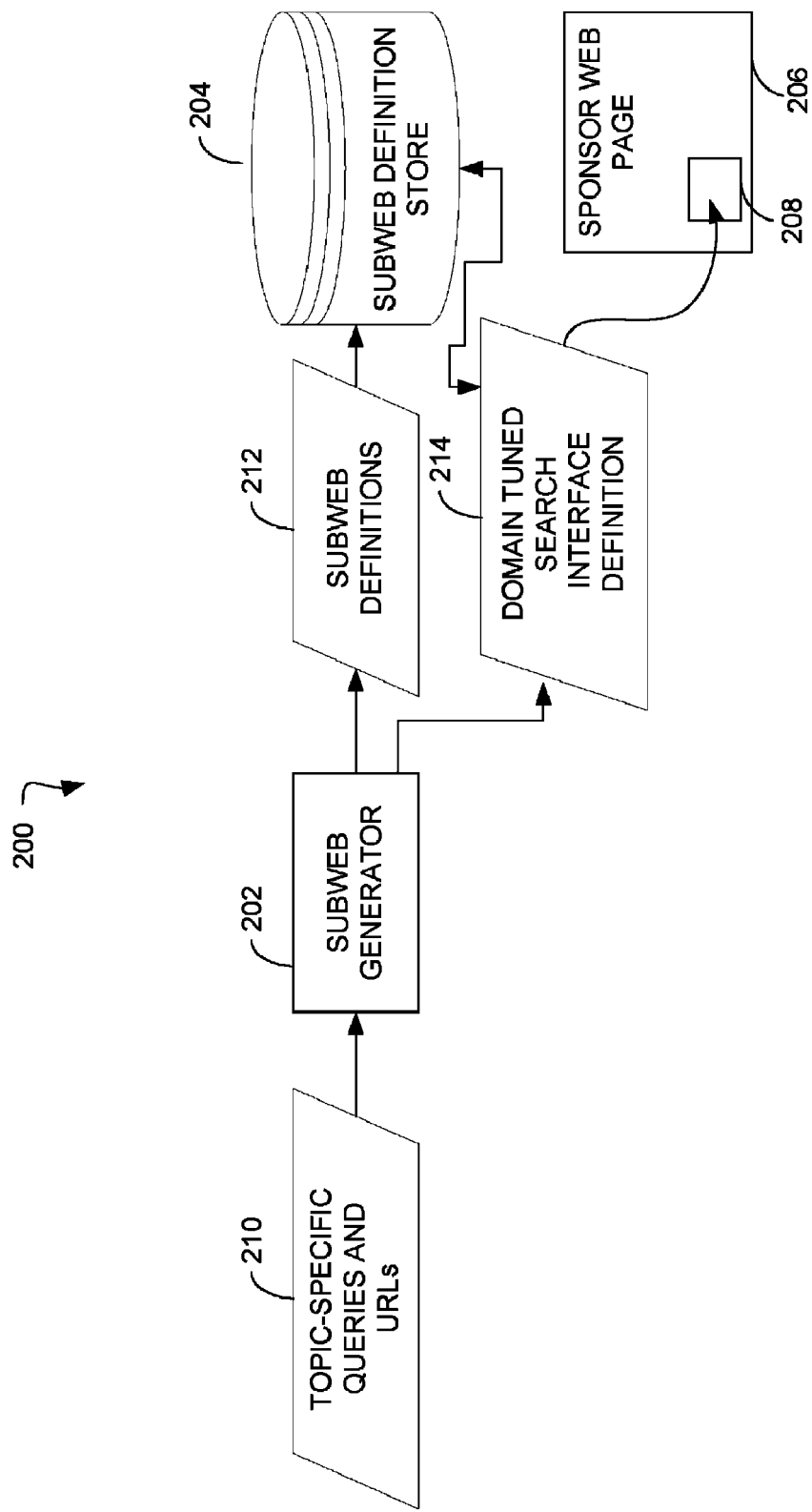
FIG. 3 is a block diagram illustrating a system for embedding domain tuned searching into a given web site.

FIG. 3 is a block diagram of a subweb generation system 200 used to generate subweb definitions that search engines 126 can utilize to provide domain tuned search results. For the sake of the present discussion, the domain tuned search results will be discussed with respect to subwebs. In other words, the technology used to allow the domain tuned search results to be returned is subweb technology which will be described below. However, the domain tuned search results could be returned using other embedded technology, such as using macros. This embodiment is described below with respect to FIG. 10. Both of these are only exemplary embodiments of how to embed domain tuned search functionality into a given web site, and other technologies could be used as well.

Figure 4:
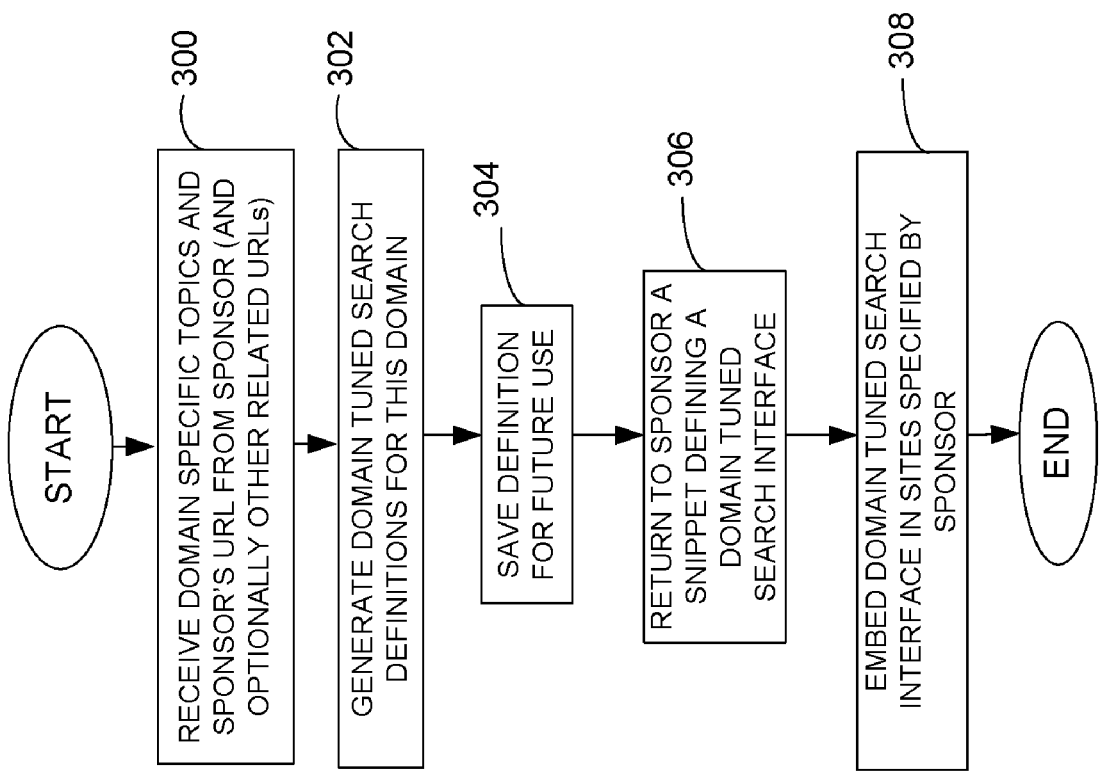
FIG. 4 is a flow diagram illustrating the overall operation of the system shown in FIG. 3.

System 200 includes subweb generator 202, which is connected to subweb definition store 204. System 200 also shows a sponsor web page 206 that includes an embedded domain tuned search interface 208. FIG. 4 is a flow diagram illustrating the overall operation of system 200 shown in FIG. 3. First, the sponsor of the web page 206 (or any other person defining a subweb to be searched through web page 206) provides topic-specific queries and optionally additional URLs 210 to subweb generator 202. This can be done, for example, by going through an interface provided by subweb generator 202 to the user for entry of topic-specific queries (which can be obtained from query logs of old queries) and URLs 210. The information in topic-specific queries and URLs 210 illustratively identifies URLs that are related to the sponsor's web page 206 as well as additional key words or other terms or queries which the sponsor believes will further define the domain (or subject matter) that the sponsor wishes to define. This is indicated by block 300 in FIG. 4.

Subweb generator 202 then generates domain tuned search definitions for the domain defined by the sponsor. This is indicated by block 302 in FIG. 4. In generating the domain tuned search definitions, subweb generator 202 may illustratively compute a set of weighted URL paths. The paths are the areas on the web which are rich in information about the domain of interest, and the weights indicate relative importance of these sites.

The way that these weights are computed for subwebs is known. Briefly, however, the key terms and queries can be provided as queries to one or more search engines. The occurrences of paths through the results returned by the one or more search engines are counted and a predefined neighborhood of results (a path list of web sites connected to those in the returned results and occurring a sufficient number of times in the results) are identified as relevant. The path list is normalized with respect to a baseline subweb where the baseline is derived from random queries. The result is a set of URL paths with weights. These URL paths, with corresponding weights that identify how important the URL paths are to the domain defined by the query terms and URLs submitted by the user, are the subweb definitions 212. The subweb generator 202 stores the subweb definitions 212 in subweb definition store 204. They are saved there for later use, during domain tuned searching. Saving the subweb definition is indicated by block 304 in FIG. 4.

Subweb generator 202 also returns to the user who is creating the subweb a snippet that defines a query box that calls the second search engine 126 for this domain (or subweb) for any query submitted by the user in order to perform domain tuned searching. The snippet is a domain tuned search interface definition 214 that may illustratively (and by way of example) be an HTML or Java script snippet that embeds the query box 208 on the sponsor's web page 206. Returning the snippet to the sponsor to define a domain tuned search interface is indicated by block 306 in FIG. 4. Embedding the domain tuned search interface in one or more web sites specified by the sponsor (in the embodiment shown in FIG. 3, it is on web page 206) is indicated by block 308 in FIG. 4. It should also be noted that the domain tuned search interface definition 214 can also be stored in store 204 and used later on the sponsor's web site.

Figure 5:
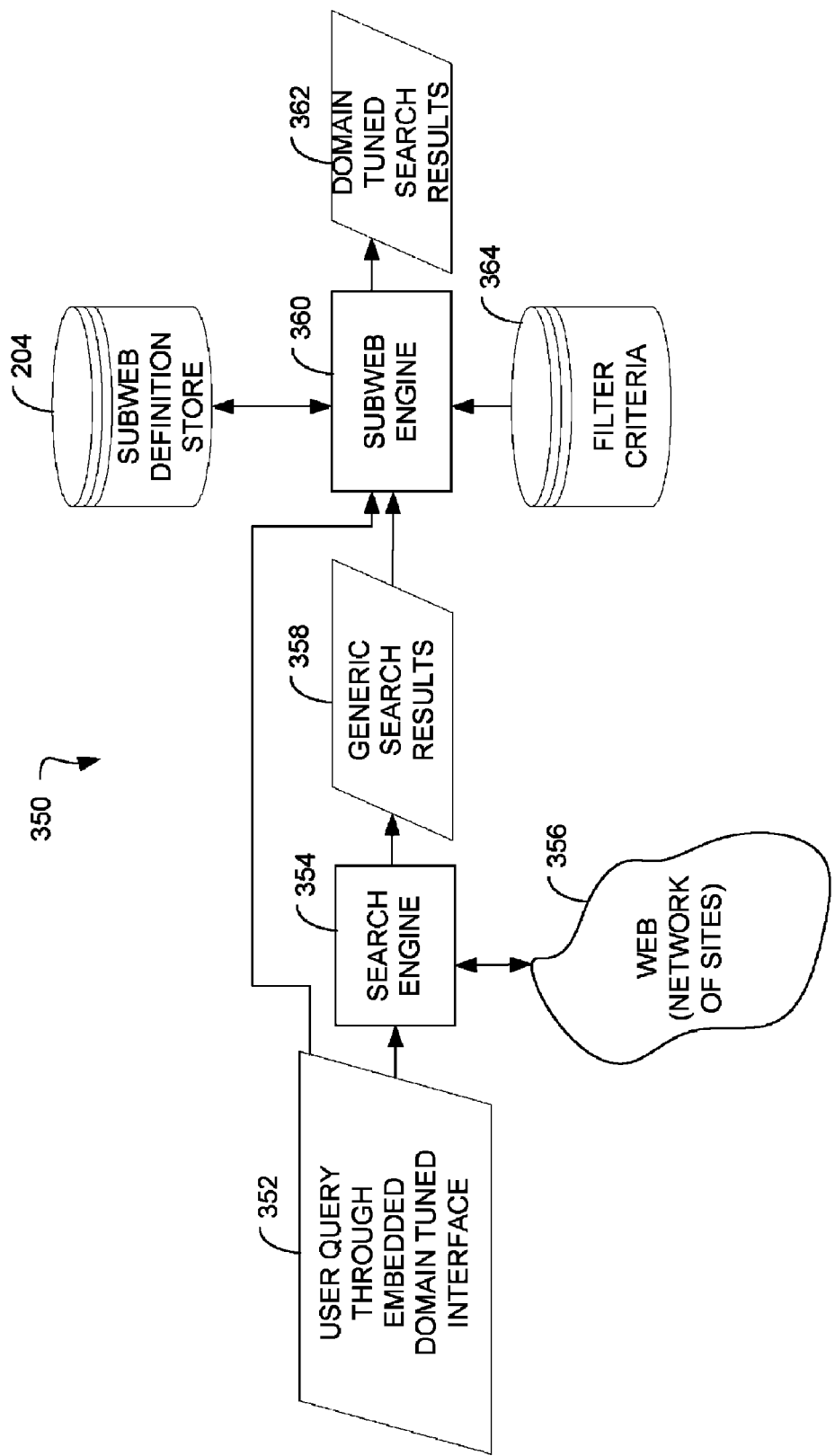
FIG. 5 is a block diagram illustrating a run time system in which domain tuned searching is performed.

FIG. 5 is a block diagram of a domain tuned search system 350 used in performing domain tuned searching for a user who is reviewing the sponsor's web page 206, that has the domain tuned search interface 208 embedded thereon. FIG.

Figure 6A:
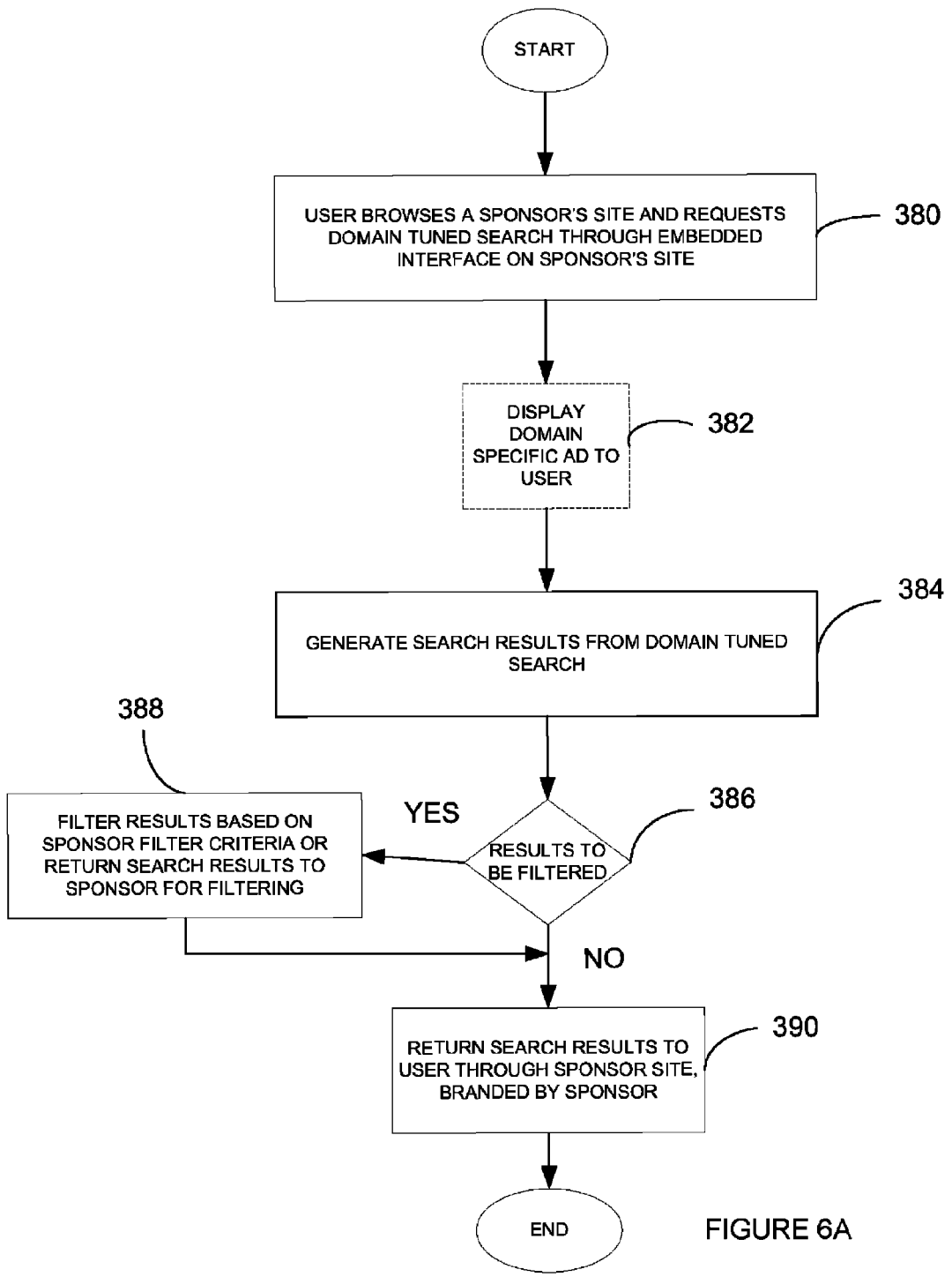
FIG. 6A is a flow diagram illustrating the overall operation of the system shown in FIG. 5.

6A is a flow diagram illustrating one embodiment of the overall operation of system 350 shown in FIG. 5. First, the user decides to perform additional searching while reviewing the sponsor web page 206. Therefore, the user enters a query into the embedded domain tuned search interface 208 on page 206. The user query is indicated by block 352 in FIG. 5, and entering the query through the embedded interface on the sponsor site is indicated by block 380 in FIG. 6A.

It should be noted that, at this point, it can be determined that the user is actually looking for some domain specific information. Therefore, search engine 354, which receives query 352 (or any other computing component), can display a domain specific advertisement to the user on the sponsor's web page 206. Of course, this is optional and is indicated by block 382 in FIG. 6A.

Figure 6B:
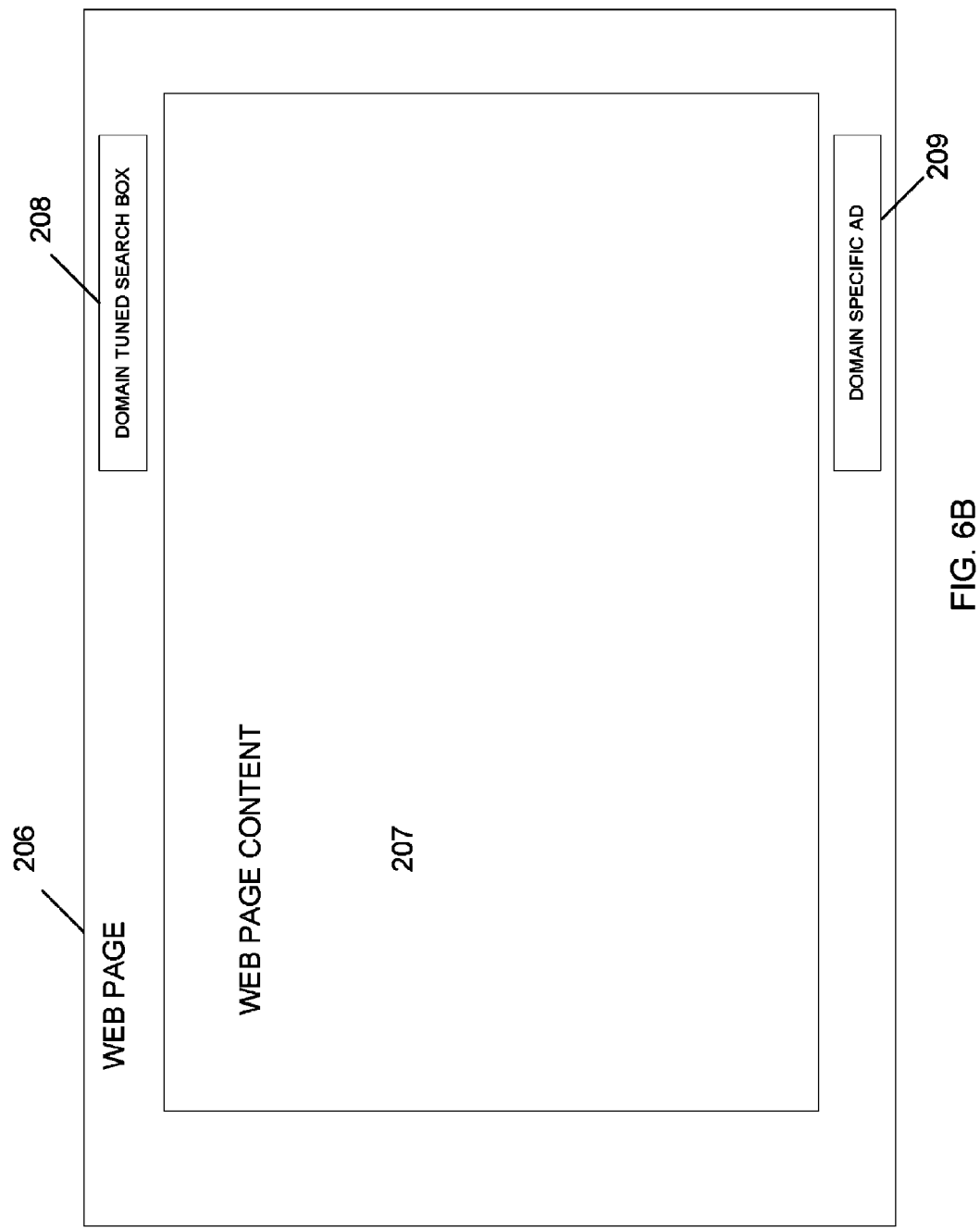
FIG. 6B is one illustration of a web page with an embedded domain tuned search interface.

FIG. 6B shows a more detailed embodiment of an exemplary sponsor web page 206. It can be seen that web page 206 includes a web page content portion 207, a domain tuned search box 208, and a domain specific advertising portion 209. Search box 208 may illustratively simply be a text box that allows a user to enter and submit a search query which, when submitted, invokes search engine 352. Advertising space 209 may illustratively present domain specific advertisements to the user, either when the user is browsing page 206, or after the user has indicated a desire to perform domain tuned searching by invoking interface 208.

Search engine 354 accesses the network of sites as indicated by block 356 in FIG. 5, based on the query 352 input by the user. Search engine 354 generates generic search results 358 by searching over a network of sites 356 that include sites in addition to the one the user is reviewing. The network 356 may be a wide area network, a metro area network, a local area network, etc. By generic, it is meant that the search results are not domain specific, in that they do not treat preferentially the weighted URL paths calculated in the domain specific definition. The generic search results are provided to subweb engine 360. Subweb engine 360 accesses subweb definition store 204 to obtain the subweb definition to be applied to the generic search results. The particular subweb definition obtained from store 204 is based on the domain of interest of the user who input query 352. This can be identified in a number of different ways. For instance, subweb engine 360 can infer the domain of interest from the web site or particular page the user is currently reviewing and which includes the embedded interface. The domain is linked to the site or page the user is viewing. Alternatively, subweb engine 360 can classify the query 352 into one of a number of predefined domains. Also, the user can explicitly choose the domain of interest by selecting it through the embedded interface. These are mentioned by way of example. Subweb engine 360 applies the subweb definition to the generic search results 358, in order to re-rank them preferentially, given the weights on the URL paths in generic search results 358, from the subweb definition retrieved from store 204. Subweb engine 360 can also consider a wide variety of other features in re-ranking the search results, such as how similar they are to the query 352, the original rank given them in the generic search results, etc. This provides domain tuned search results 362 which can be output to the user, as desired. Generating the domain tuned search results is indicated by block 384 in FIG. 6A.

Optionally, the sponsor of web page 206 that is incorporating the domain tuned search functionality, can provide additional filter criteria 364 for filtering the generic search result 358, in addition to the re-ranking performed based on the subweb definitions provided in store 204. For instance, the sponsor may not wish to return search results from a competitor's web site. Therefore, the filter criteria 364 may filter out all generic search results 358 that are generated from a competitor's web site. Of course, a wide variety of other filter criteria 364 can be used as well. When filtering is to be used, subweb engine 360 first determines that the results 358 are to be further filtered. This is indicated by block 386 in FIG. 6A. If they are to be further filtered, then subweb engine 360 simply filters the results (which have already been re-ranked) based on the sponsor filter criteria in store 364. Of course, the search results can be returned to the sponsor who may implement their own separate filter processing as well. In other words, the sponsor may wish to write their own filter programs that are applied against the re-ranked search results. In either case, applying filtering is indicated by block 388 in FIG. 6A. Subweb engine 360 then returns the search results to the user through the sponsor site 206, or through a separate web page, which can be branded with the sponsor's trademark information. This is indicated by block 390 in FIG. 6A.

Figure 7:
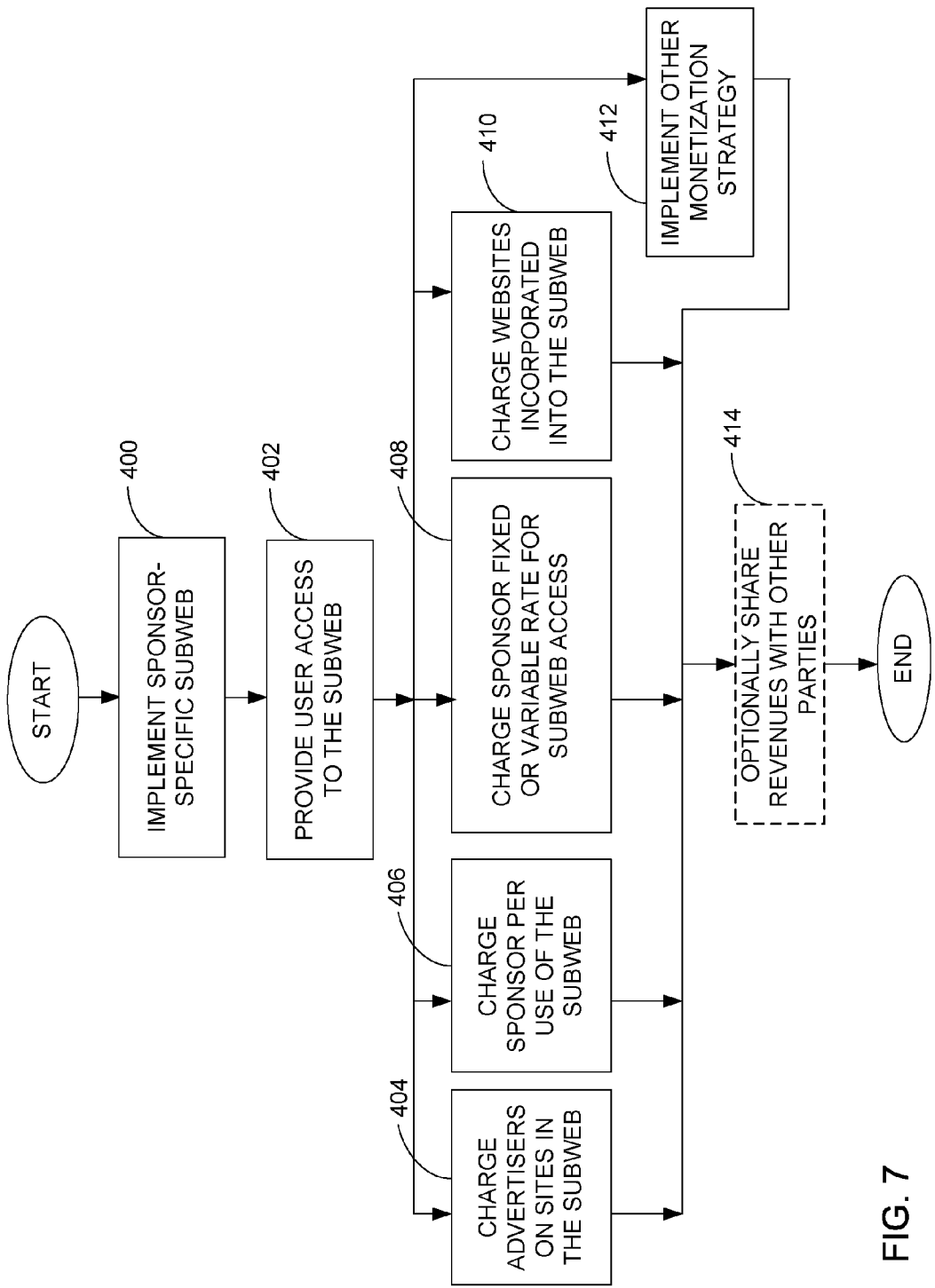
FIG. 7 is a flow diagram illustrating how a business model for monitizing a domain tuned search system can be implemented.

FIG. 7 is a flow diagram illustrating a business model that shows various ways which domain tuned search functionality can be used to generate revenues. First, as described above with respect to FIG. 3, subweb generator 202 can implement a sponsor-defined subweb. This can be the subweb definitions 212, and implementing the subweb is indicated by block 400 in FIG. 7. Then, the sponsor provides user access to the subweb through the embedded domain tuned search interface. This is indicated by block 402 in FIG. 7. The user can then use the domain tuned search interface to perform domain specific searching, as the user desires.

In order to generate revenue from this technology, a wide variety of different scenarios are contemplated. For instance, when the domain specific advertisement 209 in FIG. 6B is generated based on the user's desire to perform domain tuned searching, the advertiser that displays the advertisements 209 related to that specific domain can be charged. This is indicated by block 404 in FIG. 7. It is believed that this is a very valuable technique because the user has already entered a specific domain. The user has also indicated, by using the embedded domain tuned search interface, that the user is interested in more domain specific information. Therefore, advertisers that advertise products in that domain can be virtually ensured that this user is interested in the domain. Therefore, a very high degree of targeted advertising can be obtained using this technology.

Of course, the sponsor that has embedded the domain tuned search interface can also be charged based on how often the subwebs defined by that sponsor are used. This is indicated by block 406 in FIG. 7. In lieu of charging the sponsor based on how often the subweb is used, the sponsor may simply be charged a fixed or variable rate for providing subweb access to its customers. This is indicated by block 408 in FIG. 7. Further, when the subweb definitions are calculated, they preferentially weight links to certain web sites or web pages. Therefore, sponsors of those web pages (the ones which are linked to by the preferential weighting in the subweb definition), that wish to participate in the subweb, can also be charged. Charging web sites incorporated into the subweb is indicated by block 410 in FIG. 7.

Of course, there are myriad other monitization strategies which can be implemented in order to generate revenue from the domain tuned search technology. This is indicated by block 412 in FIG. 7.

Optionally, of course, the revenues can be shared with other parties. For instance, the sponsors that embed the domain tuned search in their web sites may be provided with a portion of the revenues earned. Similarly, sponsors of web pages that are included in the subweb may be provided with a portion of the revenues earned. Of course, the revenues can be divided any desired way, or they can simply be maintained, undivided. Optionally sharing the revenues with other parties is indicated by block 414 in FIG. 7.

Figure 8:
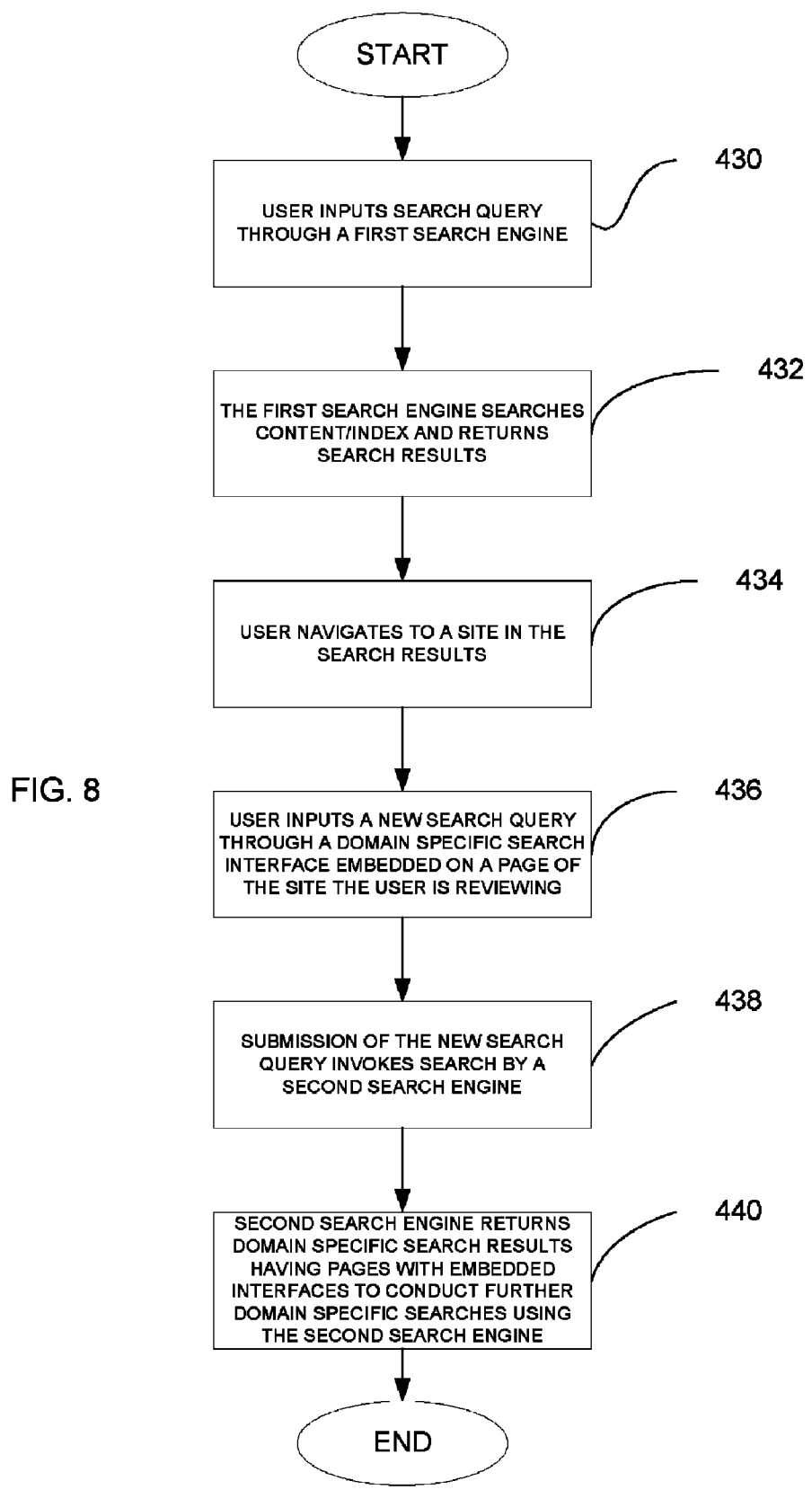
FIG. 8 is a flow diagram illustrating how to enhance traffic on a given search engine, given domain tuned searching functionality.
Figure 9:
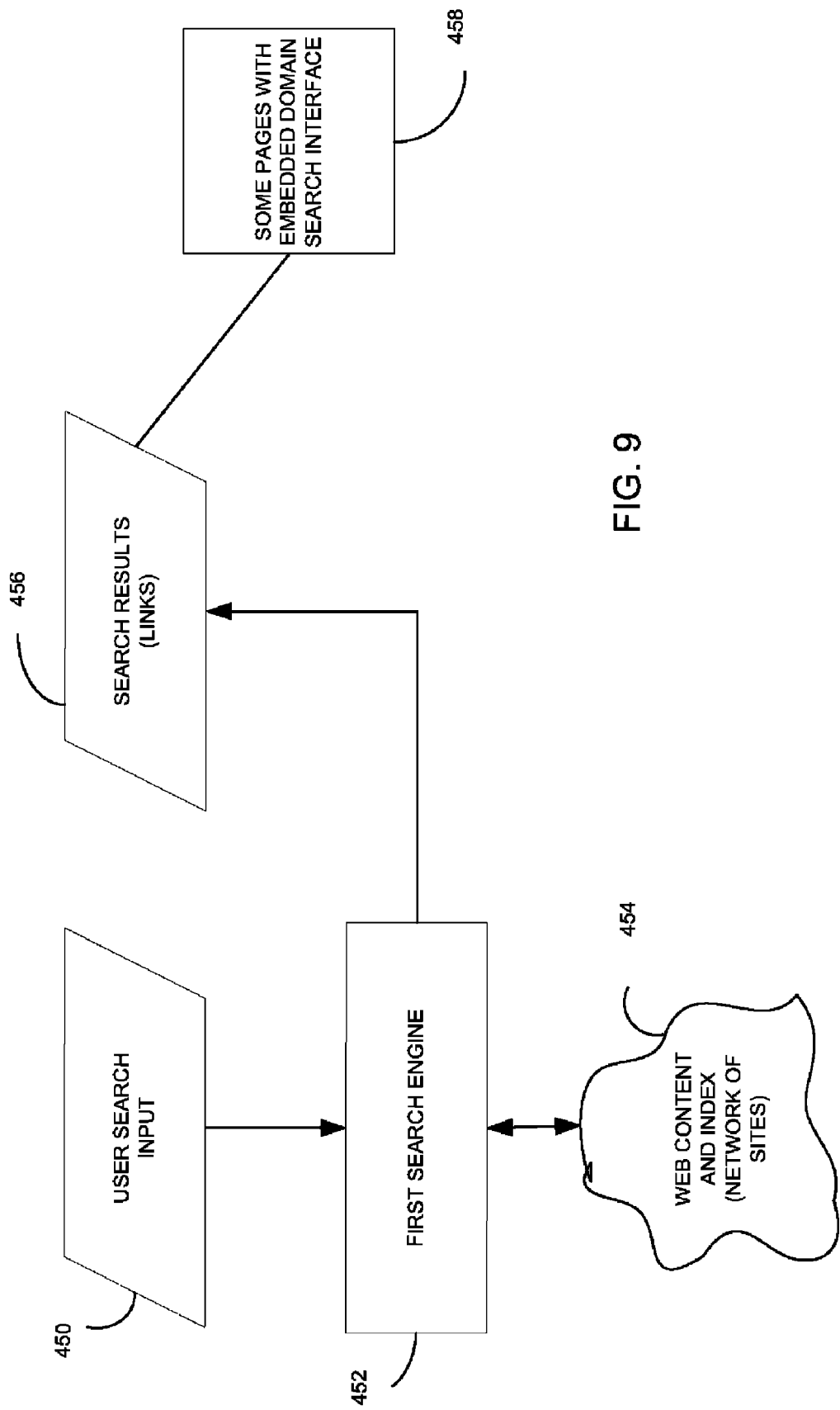
FIG. 9 is a block diagram of a search system, in which a generic search engine is used to enter a domain tuned search system.

FIG. 8 is a flow diagram illustrating how a user may access domain tuned search technology embedded in a sponsor's web site from a conventional generic search engine. FIG. 9 is a block diagram showing searching behavior illustrated in FIG. 8. For example, assume that the user is not browsing web page 206, which includes an embedded domain tuned search interface, but instead assume the user has simply opened an interface to a search engine 452 and is submitting an initial query 450. Inputting the initial search query 450 into this first search engine 452 is indicated by block 430 in FIG. 8. The first search engine 452 illustratively searches the content or index 454 of the web and returns search results 456, as discussed above with respect to FIG. 2. This is indicated by block 432 in FIG. 8.

Assume that the user then navigates from the results page to a site 458 in the search results. This is indicated by block 434. At this point, the site 458 that the user has navigated to will illustratively have the domain tuned search capability embedded therein. If so, the user simply inputs a new search query through the domain specific search interface embedded on the page of the site 458 that the user is currently reviewing. This is indicated by block 436 in FIG. 8.

It should be noted that, at this point, the user's searching activity can be redirected from the user's original, first, search engine 452, to another search engine. In other words, the user is simply entering search terms in the domain tuned search interface embedded on the web page on the site 458 the user is reviewing. The user is not expressly opening a new interface to another search engine. Therefore, when the user submits this new query, it will go to the search engine to which the embedded user interface directs it. In this case, it is a second search engine, different from the first search engine.

Invoking a search by the second search engine is indicated by block 438 in FIG. 8. The second search engine will illustratively return the domain tuned search results which, themselves, may have pages with embedded interfaces to conduct further domain specific searches using the second search engine. This is indicated by block 440 in FIG. 8. The particular way in which the domain tuned search results are provided has already been discussed above with respect to FIG. 5. FIG. 8 simply shows how searching traffic can be redirected from one search engine, chosen by a user, to another search engine, chosen by a sponsor or other entity.

As discussed above, subwebs are only one exemplary embodiment for embedding domain tuned search functionality in a desired web site. Other mechanisms for embedding domain tuned search functionality can be used as well, such as macros. Macros allow specific key terms and site preferences and restrictions to be added to a user's query. For example, a user-defined macro for digital photography reviews may be of the form "fig.camera_reviews", which adds a list of site preferences and restrictions to any query that is submitted with that macro attached to it. To use the macro, the user simply appends the macro name to the query term submitted by the user.

Figure 10:
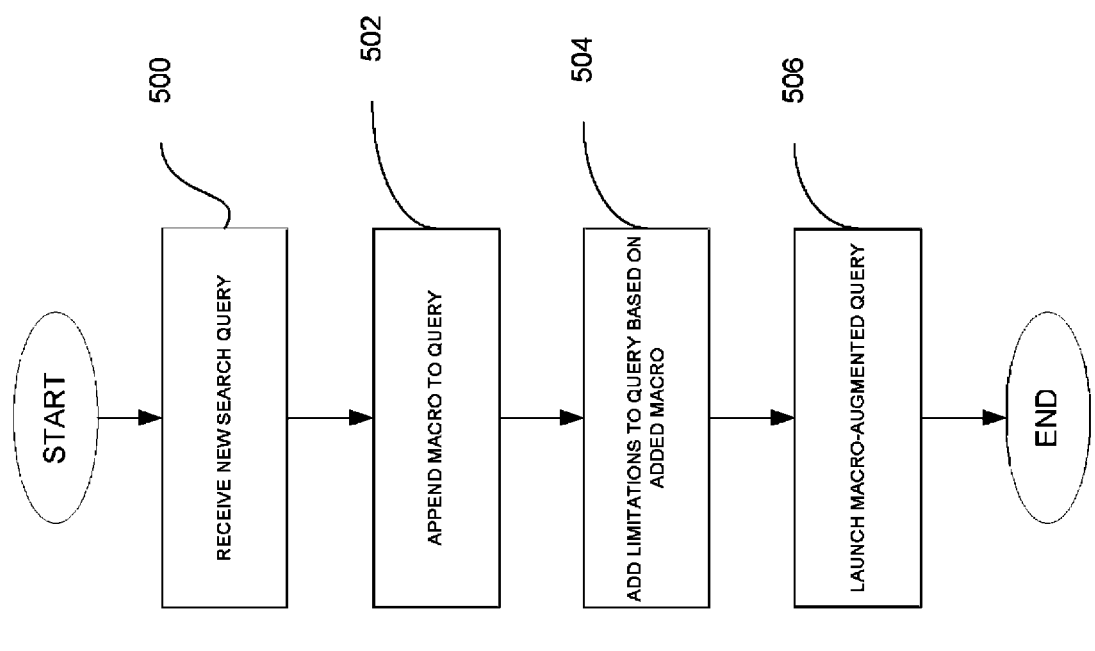
FIG. 10 is a flow diagram illustrating how domain tuned search can be implemented using macros instead of subwebs.

FIG. 10 illustrates how macros can be used in performing domain tuned search functionality. First, the new search query is received from the user, as indicated by block 500 in FIG. 10. The macro is appended, either automatically or by the user, to the query. The macro will illustratively have been predefined during the domain tuned definition procedure discussed above. The macro add keywords and places restrictions and site preferences in the query so that the query more specifically directs the search engine to domain specific web content. Appending the macros is indicated by block 502 in FIG. 10. Adding the limitations to the query based on the added macro is indicated by block 504, and launching the query with the added limitations as indicated by block 506. The search engine will then, of course, return search results which are more specifically related to the domain defined by the sponsor, than would otherwise be the case.

It can thus be seen that, by embedding domain tuned search functionality in a web site, the end user viewing the web site can obtain a much more comprehensive search than would otherwise be obtained using site search technology, but the search results returned will also be much more tailored to the domain that the user is interested in, than conventional web search technology. Therefore, the end user's searching experience will be greatly enhanced.

The embedded domain tuned search technology can also be used to embed branded, domain tuned search results for pages returned by the search engine. In other words, a sponsor's brand can be placed on the results when they are returned to a user.

Similarly, it can be seen that by embedding this branded domain tuned search functionality into commercial web sites, it can be easily tuned to the domain of those web sites. This can be used to enable highly targeted advertising to be directed to specific sets of consumers. Similarly, advertisers and site owners receive value in that users will more likely use their sites to find information with this type of functionality embedded therein. Similarly, it can be used to increase the use of the search engine which is invoked by the domain tuned search interface. It should also be noted that the subweb definitions can either be authored by an individual implementing the subwebs, by a sponsor, or by a community. Individual users can also create their own domain tuned search engines simply by setting up their own search definitions and linking them to a given search engine. Finally, it will be noted that a wide variety of different technologies can be used to implement the domain tuned search functionality and subwebs and macros are only two examples of this.

Figure 11:
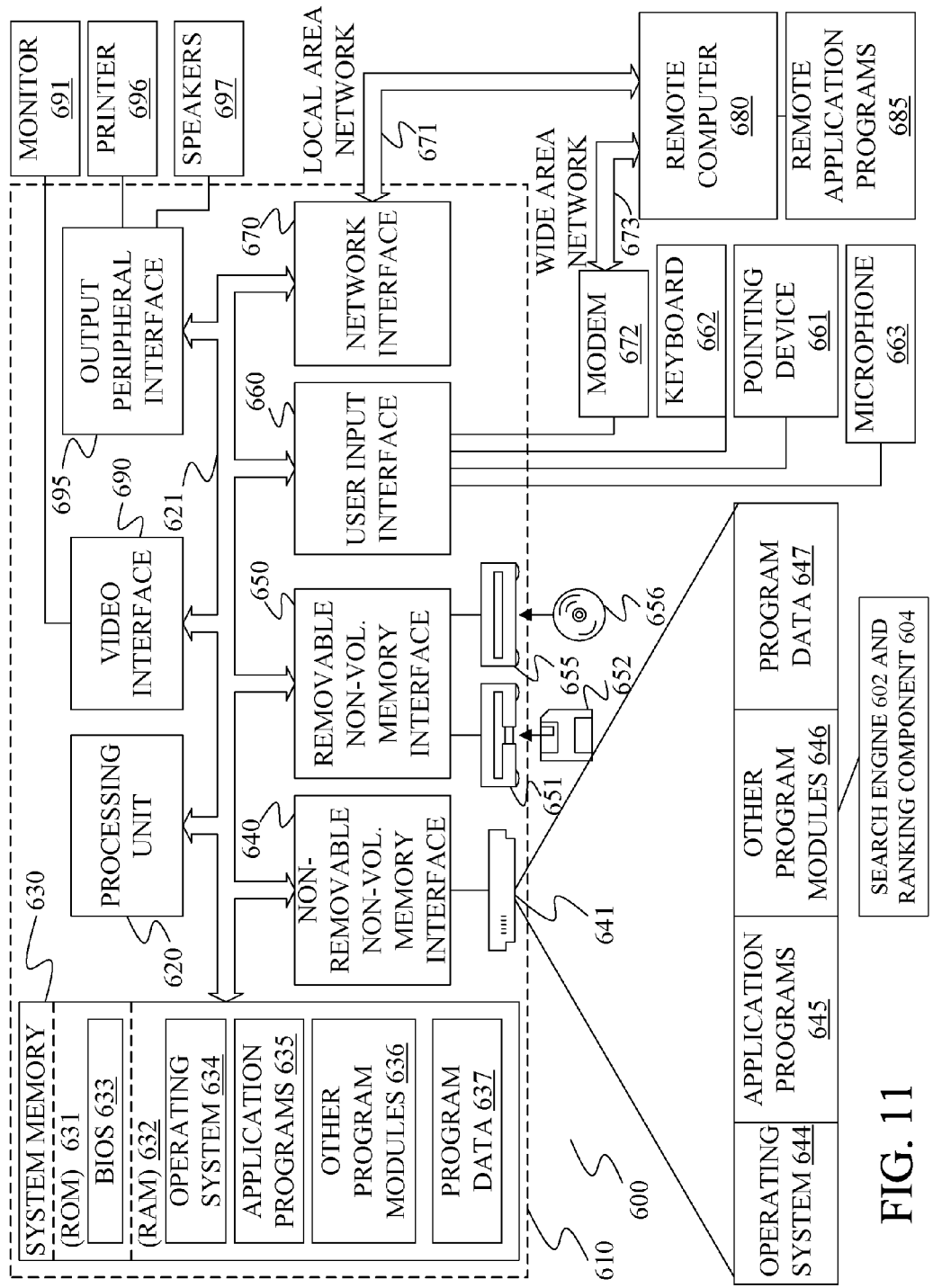
FIG. 11 is a block diagram of one illustrative computing environment.

FIG. 11 is one embodiment of a computing environment in which the invention can be used. With reference to FIG. 11, an exemplary system for implementing some embodiments includes a general-purpose computing device in the form of a computer 610. Components of computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 610 typically includes a variety of computer readable media. Computer readable media can be any available media that can be accessed by computer 610 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 11 illustrates operating system 634, application programs 635, other program modules 636, and program data 637. The systems discussed above in FIGS. 2-10 can be stored in other program modules 646 or elsewhere, including being stored remotely.

The computer 610 may also include other removable/non-removable volatile/nonvolatile computer storage media. By way of example only, FIG. 11 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 11, provide storage of computer readable instructions, data structures, program modules and other data for the computer 610. In FIG. 11, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. Also, modules 646, or other portions of FIG. 11, can include one or more search engines 602 and ranking components 604, which may also comprise search engine 354 and subweb engine 360.

FIG. 11 shows the clustering system in other program modules 646. It should be noted, however, that it can reside elsewhere, including on a remote computer, or at other places.

A user may enter commands and information into the computer 610 through input devices such as a keyboard 662, a microphone 663, and a pointing device 661, such as a mouse, trackball or touch pad. Other input devices (not shown) may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 is operated in a networked environment using logical connections to one or more remote computers, such as a remote computer 680. The remote computer 680 may be a personal computer, a hand-held device, a server, a router, a network PC, a peer device or other common network node, and typically includes many or all of the elements described above relative to the computer 610. The logical connections depicted in FIG. 11 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 11 illustrates remote application programs 685 as residing on remote computer 680. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implementing a search function on a web site of interest, comprising:

receiving topic specific information that identifies subject matter content of the web site of interest;

generating, using a computer processor, a topic specific definition based on the topic specific information that identifies the subject matter content of the web site of interest, the topic specific definition weighting search results, returned from a first search engine, based on how related the search results are to the topic specific information in terms of subject matter content;

storing the topic specific definition;

generating a domain tuned search interface definition that defines a search interface;

embedding the search interface on the web site of interest;

receiving a search input through the embedded search interface from a user reviewing the web site of interest, the search input being separate from the stored topic specific definition;

using a second search engine to return non-domain specific search results, the second search engine searching for the non-domain specific search results from web sites in addition to the web site of interest; and using a result ranking component that accesses the stored topic specific definition and returns domain tuned search results by re-ranking the non-domain specific search results from the second search engine using the stored topic specific definition.

2. The method of claim 1 wherein generating the topic specific definition comprises:

preferentially weighting paths on a network of sites that lead to relevant web sites having content that is more similar to the topic specific information than paths to web sites that are less similar to the topic specific information.

3. The method of claim 2 and further comprising:
generating revenue by charging sponsors of the relevant web sites.

4. The method of claim 1 and further comprising:
after a user has input the search input through the search interface, and in response to the user inputting the search input, displaying on the web site of interest a domain tuned advertisement having a subject that is based on the topic specific definition.

5. The method of claim 4 and further comprising:
generating revenue by charging advertisers that are advertising using the domain tuned advertisement.

6. The method of claim 1 and further comprising:
generating revenue by charging a sponsor of the web site of interest based on embedding the search interface on the web site of interest.

7. The method of claim 6 wherein generating revenue comprises:
charging the sponsor of the web site of interest an amount based on how often the search interface is used by users.

8. The method of claim 1 wherein the search interface invokes the second search engine which is different from the first search engine.

9. The method of claim 1 wherein generating a topic specific definition comprises:
generating a macro, added to the search input provided by the user, based on the topic specific information.

10. A system for performing domain tuned searching from a page of a web site of interest, comprising:

a domain definition system receiving domain specific information for a domain of interest, the domain specific information describing subject matter content of the web site of interest, the domain definition system generating a domain definition based on the domain specific information and generating a domain tuned search interface definition defining a domain tuned search interface embedded on the page of the web site of interest;

a domain definition store storing the domain definition; and a search system including a first search engine, associated with the domain tuned search interface, receiving a first query through the web site of interest, the first query being different from the domain definition, and searching a network of sites to generate search results based on how similar the search results are to the first query, the search system further generating the search results based on how similar in terms of subject matter content the search results are to the domain definition for the domain of interest, the search system further outputting the search results for display to the user.

11. The system of claim 10 wherein the domain specific information comprises domain specific uniform resource locators, domain specific queries from query logs that store prior queries, and keywords.

12. The system of claim 10 wherein the domain definition comprises a macro indicative of restrictions to be added to the first query and wherein the first search engine generates the search results based on the first query with the restrictions indicated by the macro.

13. The system of claim 10 wherein the domain definition system comprises:

a community domain definition system in which the domain definition is generated from community inputs.

14. A method implementing a search function on a web site of interest, comprising:

receiving topic specific information and defining a domain of interest based on the topic specific information describing subject matter content of the web site of interest;

generating a topic specific definition that weights search results, returned from a first search engine, based on how related the search results are to the domain of interest in terms of subject matter content;

generating filter criteria that identifies one or more particular web sites that are to be excluded from search results on the web site of interest;

storing the topic specific definition and the filter criteria;

generating a domain tuned search interface definition that defines a search interface;

embedding the search interface on the web site of interest;

receiving a search input at the embedded search interface from a user reviewing the web site of interest, the search input being different from the topic specific definition;

using a second search engine that returns non-domain specific search results, the second search engine searching for the non-domain specific search results from web sites in addition to the web site of interest using a computer processor;

using a result ranking component that accesses the stored topic specific definition and returns domain tuned search results by re-ranking the non-domain specific search results using the stored topic specific definition; and removing, after the non-domain specific search results have been re-ranked, the one or more particular web sites from the domain tuned search results based on the stored filter criteria.

15. The method of claim 14 wherein generating the topic specific definition comprises:

preferentially weighting paths on a network of sites that lead to relevant web sites having content that is more similar to the topic specific information than paths to web sites that are less similar to the topic specific information.

16. The method of claim 15 and further comprising:

generating revenue by charging sponsors of the relevant web sites.

17. The method of claim 14 and further comprising:
after a user has input the search input through the search interface, and in response to the user inputting the search input, displaying on the web site of interest a domain tuned advertisement having a subject that is based on the domain of interest.

18. The method of claim 17 and further comprising:
generating revenue by charging advertisers that are advertising using the domain tuned advertisement.

19. The method of claim 14 and further comprising:
generating revenue by charging a sponsor of the web site of interest based on embedding the search interface on the web site of interest.

20. The method of claim 19 wherein generating revenue comprises:
charging the sponsor of the web site of interest an amount based on how often the search interface is used by users.

\* \* \* \* \*